July 11, 1950 C. W. DALZELL 2,514,745
CHANGEABLE SCALE ELECTRICAL TESTING INSTRUMENT
Filed Dec. 19, 1946 3 Sheets-Sheet 1
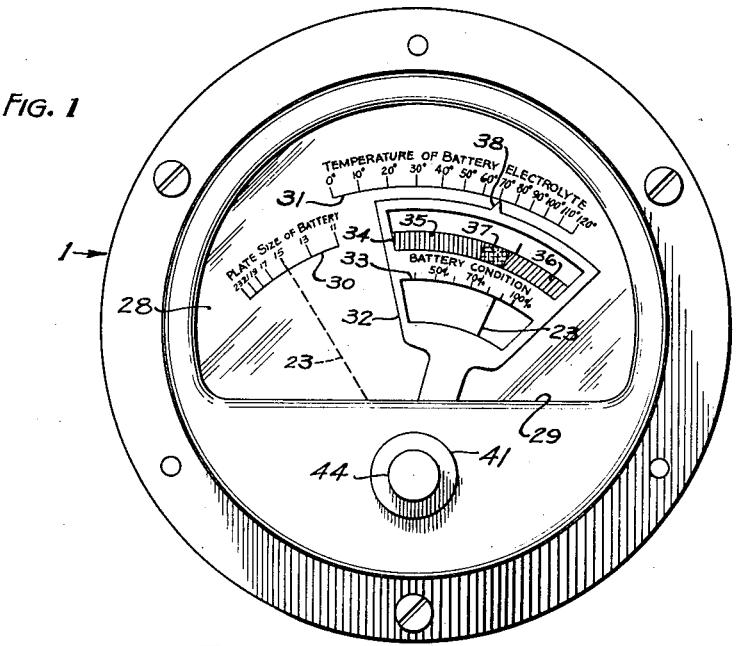
Inventor
CLARENCE W. DALZELL
By Semmes, Keegin, Robinson and Semmes
Attorneys July 11, 1950 C. W. DALZELL 2,514,745
CHANGEABLE SCALE ELECTRICAL TESTING INSTRUMENT
Filed Dec. 19, 1946 3 Sheets-Sheet 2
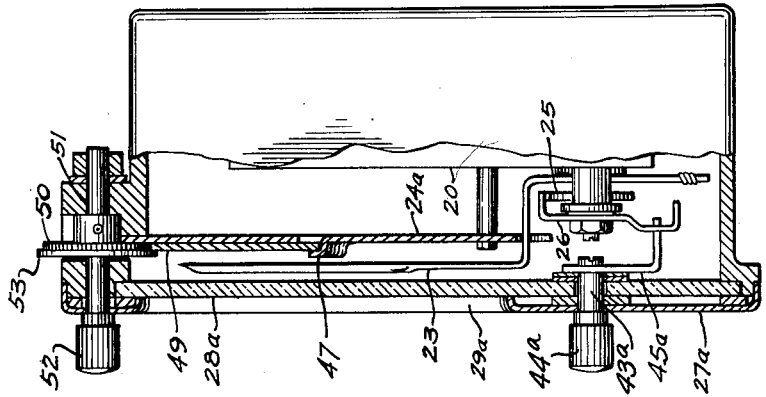
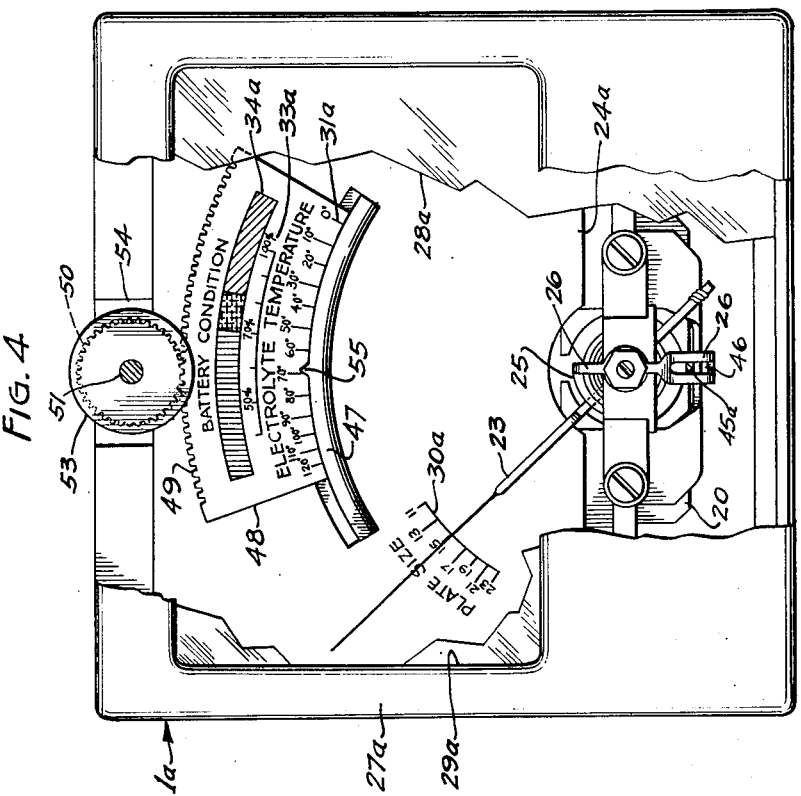
Inventor
CLARENCE W. DALZELL

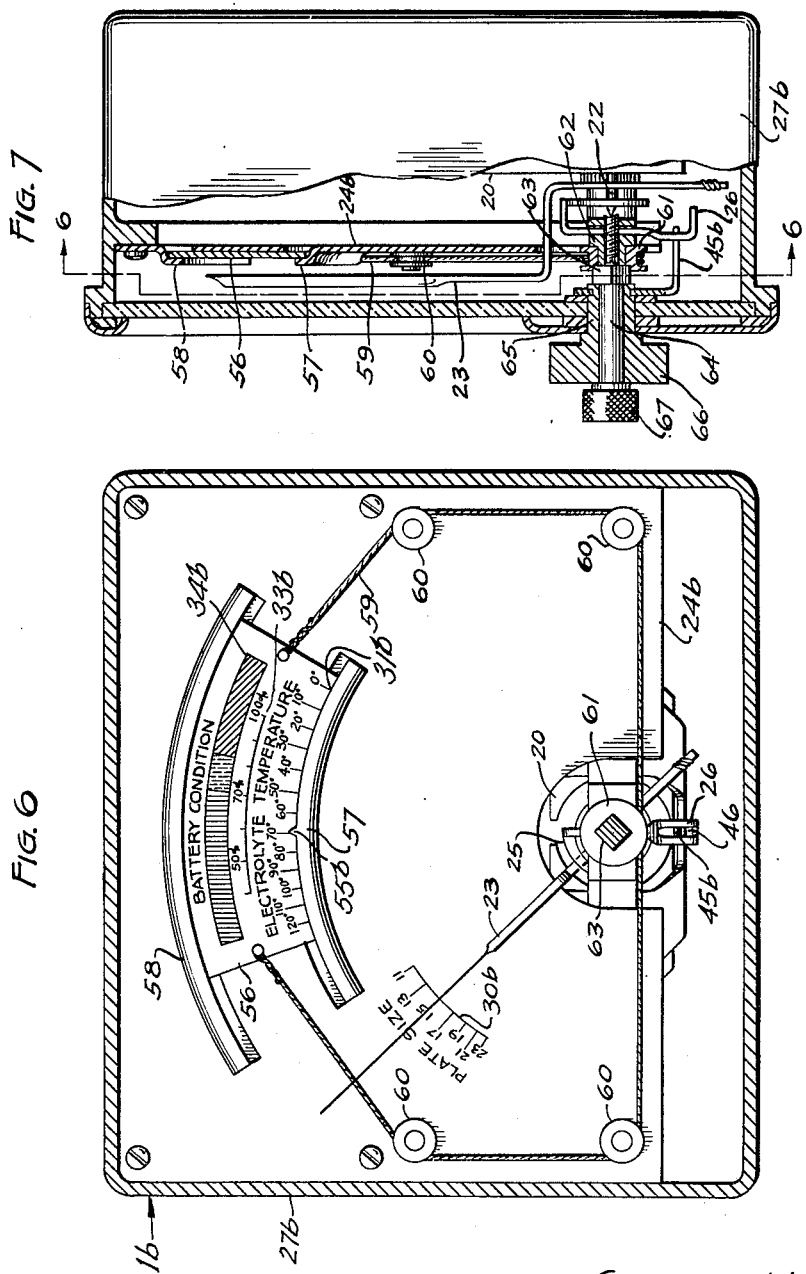

UNITED STATES PATENT OFFICE 2,514,745

CHANGEABLE SCALE ELECTRICAL TESTING INSTRUMENT

Clarence W. Dalzell, West Caldwell, N. J., assignor to Heyer Industries Incorporated, Belleville, N. J., a corporation of Delaware Application December 19, 1946, Serial No. 717,119

7 Claims. (Cl. 171—95)

This invention relates to electric testing equipment and more particularly to an electric meter for indicating directly to the observer a true condition of a specimen to be tested where such true condition is dependent upon correction or compensation for varying characteristics of the specimen. The present application is a continuation-in-part of my copending applications Serial No. 497,483 filed August 6, 1943 and now Patent No. 2,341,992 granted December 2, 1947, and Serial No. 574,120 filed January 23, 1945.

While the invention herein disclosed is particularly adapted for indicating the condition or capacity of storage batteries, and will be described in connection with the testing of storage batteries where a true indication of the condition of the battery is dependent upon two variable characteristics of the battery, namely, the size (number of plates) and the temperature of the electrolyte, it is to be understood that the invention is generally applicable for giving a direct reading of values of delivered quantities in other devices which are dependent upon variable characteristics of the device. For example, the meter may be employed in testing the electrostatic capacity or dielectric resistance of an electric cable where consideration must be given to different thicknesses of cable and the kinds of dielectric material upon which the capacity and resistance depend.

Storage batteries are tested for voltage, as an indication of their condition, by discharging through a resistance and measuring the voltage while discharging. Heretofore in the testing of storage batteries, it has been proposed to measure the voltage of the battery while discharging a heavy current through a fixed low resistance, and to make allowance for resistance offered to said current resulting from different variables, such as the size or number of plates in the battery, the temperature of the electrolyte, or other variable characteristics of the battery, by placing a rheostat in the circuit of the measuring instrument which will cut more or less resistance into the circuit according to the value of the variable. Usually, the pointer of the rheostat moves over a scale graduated in values of the variable.

By way of example, the internal resistance of a storage battery diminishes as the number of its plates increases, with a consequence that a battery having a small number of plates will have a lower terminal voltage than one having a greater number of plates. Standard voltage values as an indication of the condition of the battery, regardless of its size, is highly desirable and, therefore, in order to obtain the same amount of needle deflection in the testing instrument for 11, 13, 15, etc., plate batteries of the same condition, a proportionately increasing amount of the rheostat's resistance is cut into series with the battery as the number of plates increase. Similarly, the terminal voltage of the battery will be lower in a cold battery than in one in which the electrolyte is warmer, and the rheostat accordingly is regulated to increase its resistance as the temperature of the electrolyte increases.

The above arrangement, however, is subject to several disadvantages since the rheostat is comparatively expensive and its winding is liable to have variations in resistance per unit length of wire which would have to be taken in consideration in the calibration of the instrument.

In my copending applications above mentioned, there are disclosed means for overcoming these disadvantages by compensating the meter itself for the value of a variable characteristic upon which the condition of the battery being tested is dependent. This is accomplished either by adjusting the initial or zero position of the needle relatively with respect to a fixed voltage or condition indicating scale according to the value of said characteristic, or by adjusting a movable voltage or condition indicating scale relatively with respect to the zero position of the needle of the meter. Thus compensated, the point of registration of the needle on the condition indicating scale will be the same for batteries in the same condition regardless of the terminal voltage of the battery.

While the meters in the aforesaid applications afford a simple means of obtaining a direct and accurate reading of the condition of a specimen compensated for a single variable characteristic upon which the condition depends, it has been found desirable, particularly in the field when testing a variety of specimens under various conditions, to have a single test instrument which may be readily and easily compensated for more than one variable. For example, in testing numbers of storage batteries of various commercial sizes from 15 to 23 plates and under conditions where the tests are made with the electrolyte at various temperatures, it would be advantageous to carry a single instrument which could be readily compensated for these two variables.

It is, therefore, an object of this invention to provide an electrical testing instrument comprising a meter having manually adjustable means to compensate the same for more than one variable characteristic of a specimen to give a direct reading of the true condition of the specimen dependent upon such variable characteristics.

Another object of this invention is to provide an electrical meter having manual adjusting means to compensate the same for two variable characteristics of storage batteries to give a direct reading of the condition of the battery which is dependent upon the values of the said characteristics.

Another object of the invention is to provide a meter for testing storage batteries having manual adjusting means for compensating the same for both the size of the battery and the temperature of the battery electrolyte.

A further object of this invention is to provide an electrical meter for testing the condition of a specimen, the meter having means for manually adjusting the zero position of the indicator needle thereof to compensate the meter for one variable characteristic of the specimen, and having a condition indicating scale cooperating with the needle and with manually operated means for adjusting the position of the condition indicating scale relatively with respect to the adjusted zero position of the needle to compensate the meter for a second variable characteristic of the specimen.

With the above and other important objects and advantages in view which will become more apparent during the course of the following description, the invention consists in the parts and combinations hereinafter set forth with the understanding that various changes may be made therein such as in the construction, size and arrangement of parts, by those skilled in the art, without departing from the spirit of the invention.

In order to make the invention more clearly understood, it has been made the subject of illustration in the accompanying drawings which show several embodiments and in which:

In the drawings:

Figure 1 is a front elevational view of a voltmeter for use in the testing of storage batteries and provided with means for compensating the meter for two variable characteristics of the batteries in accordance with one embodiment of this invention.

Figure 2 is a side elevational view partly in vertical cross section of the meter shown in Figure 1.

Figure 3 is a diagrammatic view of the application of the meter in making the test on a storage battery, the meter being in a bridge circuit for suppressing the zero and expanding the scale of the meter.

Figure 4 is a front elevational view partly broken away showing a modified form of meter.

Figure 5 is a side elevational view partly in vertical cross section of the meter shown in Figure 4.

Figure 6 is a front elevational view of a further modified meter with the meter case being shown in cross section.

Figure 7 is a side elevational view partly in vertical cross section of the meter shown in Figure 6.

In the testing of storage batteries, the interest is mainly limited to a voltage range of between 5 to 6 volts for a 6 volt storage battery and for this reason it is desirable to use a meter with a suppressed zero and an expanded scale—that is, a meter in which a major portion or even a whole arc of deflection of the needle is within a range of from 5 to 6 volts. A convenient and simple means for obtaining a suppressed zero-expanded scale characteristic in a commercial, linear deflection voltmeter, is illustrated diagrammatically in Figure 3.

As shown in Figure 3, a voltmeter, indicated generally as 1, is connected in a bridge circuit 2 consisting of resistances 3 and 4 which remain constant irrespective of the current flowing through them within the range of operation of the apparatus, and lamps 5 and 6 whose resistance increases with the current passing through them. A meter thus connected and at zero voltage, will have a zero deflection. As the voltage increases from zero to 5, current will flow through the lamps 5 and 6 and the meter will have a negative deflection. At 5 volts the resistances of the lamps 5 and 6 will have increased to such a value that the deflection of the meter needle is again zero, and when the voltage increases above 5 the deflection will be positive. The constants of the bridge circuit 2 are so arranged that the range from 5 to 6 volts gives a full scale positive deflection of the needle by using this second zero point corresponding to 5 volts.

Figure 3 shows the meter 1 and bridge 2 connected to a battery 7 to be tested. The battery 7 has its terminals 8 and 9 connected to a fixed, low load resistance 10 by leads 11 and 12 and contacts 13 and 14 of a switch 15. The switch 15 is preferably of a push button type and is provided with a second set of contacts 16 and 17 through which, and leads 18, the meter may be connected to the bridge circuit. The bridge circuit of itself as shown in Figure 3 is connected by the wires 19 to the battery posts which means that lamps 5 and 6 are energized immediately upon connecting the leads to the battery. These lamps take only a few moments to reach a stable value of resistance and become fully warmed up. By the time the operator has gotten around to pressing the button 15, the lamps have been stabilized in resistance value and no reverse deflection of the meter will prevail unless the voltage of the battery is extremely low and below the zero voltage value on the meter scale.

To avoid a momentarily initial negative deflection of the meter at the moment the leads are connected to the battery due to the slow heating of the lamps 5 and 6 and to avoid full scale or beyond full scale readings of the meter which would be brought about by the high open circuit voltage of the battery, switch contacts 16—17 are used. To avoid these confusions, switch contacts 16—17 permit the meter to be connected to the circuit only after load 10 has been connected across the battery. This is effected by arranging the switch 15 so that contacts 16 and 17 close after contacts 13 and 14 have been closed.

The three embodiments of the meter shown in the drawings are all essentially alike, being of the moving coil or D'Arsonval type in which the deflection of the indicating needle is a linear function of the milliamperes flowing through the coil. The meter has a permanent magnet 20 between the poles of which the coil 21 is rotatably mounted on a pivot 22. Mounted for movement with the coil 21 and about the pivotal axis thereof, is an indicator, preferably in the form of a needle 23, adapted to move over the face of a fixed dial 24 against the tension of a light spiral spring 25. The inner end of the spring 25 is secured to the pivot 22 while its outer end is secured to one end of an arm 26 which is pivoted adjacent its midsection for rotation about the axis of the pivot 22. The unstressed position of the spring 25 determines the initial or zero position of the needle which may be changed, within limits, by movement of the arm 26. The above structure is enclosed within a case 27 provided with a front glass 28 and a window 29 through which the meter may be read.

According to the invention, means are provided to compensate the meter for two variables of the battery being tested—for example, the battery size and the electrolyte temperature—in order that the meter will give an indication of the true condition of the battery. In order to compensate the meter for one of these variables, for instance, the battery size or number of its plates, I propose to adjust the zero or initial position of the needle, while to compensate for the second variable, or temperature of the electrolyte, I propose to employ a movable dial or flag bearing a scale of values or other indication of the condition of the battery and which is adjustable relatively with respect to the adjusted zero position of the needle. Separate knobs, easily manipulated from outside the meter case, are provided for making these adjustments.

In the embodiment of the meter shown in Figures 1 and 2, the fixed dial 24 is provided with an arcuate scale 30 on the left hand side of the dial 24 adjacent the zero position of the needle, and with respect to which the zero position of the needle may be adjusted. The scale 30 has numbered graduations respectively designating the various sizes of commercial automobile batteries from 11 to 23 plates. Adjacent the scale 30, on the right hand side of the dial 24, is a second fixed arcuate scale 31 which is graduated in degrees of electrolyte temperature which may be encountered under various test conditions, such as from 0° to 120° F.

Mounted for rotary adjustment about the axis of the needle pivot 22 across the fixed scale 31 and adapted to cooperate with the needle 23, is a movable dial or flag 32. The flag 32 is provided with one or more concentric arcuate scales of values relating to the condition of the battery. For example, one scale 33 may be graduated in percentages of rated capacity to which the battery is charged. Another scale 34, concentric with the scale 33 may be divided into color zones corresponding to certain critical sub ranges of the scale 33, such as a red zone 35 indicating a subnormal voltage requiring recharging or replacement of the battery, a green color zone 36 indicating voltage showing a fully or sufficiently charged battery, and an intermediate yellow zone 37. The flag 32 is suitably cut away in order that the position of the needle moving between it and the dial 24 may be seen. On its upper edge, the flag 32 is provided with a pointer 38 by means of which the position of the flag with respect to the temperature scale 31 may be accurately adjusted.

To provide means for manually adjusting the flag 32, its lower end or pivot point is secured to the inner end of a short hollow shaft 39 which is rotatably journaled in a sleeve 40 fixed in and passing through the front wall of the meter case 27 and in axial alignment with the pivot 22. The outer end of the shaft 39 carries a knob 41, and preferably a friction washer 42 is provided between the flag 32 and sleeve 40 to restrain movement and accidental displacement of the flag 32.

Journalled in the shaft 39 and extending therethrough is a second shaft 43, the outer end of which carries a knob 44. The inner end of the shaft 43 has rigidly secured thereto one end of an arm 45. The opposite end of the arm 45 is bent toward and engages a slot 46 in the spring adjusting arm 26. It will be seen from the above that manipulation of the knob 44 will move the outer end of the spring 25 about the pivot 22 and, as a consequence, adjust the zero position of the needle 23 with respect to the scale 30, while manipulation of the knob 41 will adjust the flag 32 with respect to the scale 31.

As stated above, the terminal voltage of a discharging battery increases with increase in battery size and also with increase in the temperature of the electrolyte. It will be noted therefore, that the scale 30 is numbered with a smaller size battery at the right hand end of the scale, or nearest the flag 32 and the lowest temperature graduation is at the left hand end of the scale 31 or nearest the zero position of the needle 23.

In testing a battery, the operator first adjusts the zero position of the needle 23 by means of a knob 44 to a point on the scale 30 which corresponds to the number of plates in the battery under test. He then adjusts the position of the flag 32 to a point on the scale 31 which corresponds to the temperature of the electrolyte which may be ascertained by inserting a thermometer into the electrolyte. The resistance 10 and meter 1 with its bridge circuit 2 are connected across the terminals of the battery and the switch 15 closed.

In the example illustrated in Figure 1, the meter is adjusted for a 15 plate battery having an electrolyte temperature of 70°. With the meter, bridge and resistance connected across the battery terminals as indicated in Figure 3, when the switch 15 is closed the needle of the meter will be deflected an amount corresponding to the terminal voltage of the battery and indicate on the flag 32, the condition of the battery, which in the example shown in Figure 1 is about 85% of its rated capacity, or in good condition.

In the modified form of meter 1a shown in Figures 4 and 5, the magnet, coil, needle, spring and pivoted zero adjusting arm are the same as in the foregoing and bear the same reference numerals. The meter 1a, however, is enclosed in a rectangular case 27a, having a rectangular front window 29a behind which is a glass 28a.

The meter 1a is provided with a fixed dial 24a, over which the needle 23 moves, and on the right hand side of which, adjacent the zero position of the needle 23 is a graduated battery size scale 30a similar to the scale 30. In the meter shown in Figures 4 and 5 the needle is adapted to move in front of the condition indicating scale. To provide for this, an arcuate portion of the dial 24a is cut out and bent forwardly and upwardly to form an arcuate trackway 47, concentric with the rotational axis of the needle, and in which is adapted to ride an arcuate dial or flag 48 which has imprinted thereon battery condition scales 33a and 34a similar respectively to the corresponding percentage of rated capacity and sub range color scales 33 and 34 described above.

To adjust the flag 48 relatively with respect to the zero position of the needle 23, its upper arcuate edge is provided with gear teeth 49 which mesh with teeth of a gear 50 carried on a shaft 51 suitably journalled for rotation in the upper part of the case 27a. The forward end of the shaft 51 is provided with an operating knob 52, while a disc 53, somewhat larger than the gear 50 to overlie the upper edge of the flag 48, is provided on the shaft 51 adjacent the gear 50 and serves with the upturned edge of the track 47 to hold the flag against the face of the dial 24a. The disc 53 and gear 50 rotate in a cut out 54 in the meter case. In this case, preferably, the flag 48 is marked with an electrolyte temperature scale 31a whose temperature graduations register with a pointer 55 on the upturned edge of the track 47.

It will be obvious from the above that rotation of the knob 52 will move the flag 48 toward or away from the zero position of the needle 23 to desired point as indicated by the temperature scale 31a. It will be noted that in the present case the lower temperature graduation of the scale 31a is on the right hand side of the scale in order that the flag at lower electrolyte temperatures will be moved nearer the zero position of the needle and vice versa.

The zero position of the needle 23 of the meter 1a is adjusted in a manner similar to that of the meter 1 by means of a knob 44a carried on the outer end of a short shaft 43a which passes through the front face of the meter case and carries on its inner end an arm 45a which engages the slotted end 46 of the spring adjusting arm 26.

The further modified meter 1b, shown in Figures 6 and 7, is somewhat similar to the meter 1a and is enclosed in a rectangular case 27b. In this case, however, an arcuate, condition indicating flag 56 is mounted for movement in a pair of arcuate tracks 57 and 58 struck up from the meter dial 24b concentric with the axis of rotation of the needle 23. The flag 56 carries battery condition indicating scales 33b and 34b similar to the scales 33a and 34a, and also carries an electrolyte temperature indicating scale 31b, similar to the scale 31a and adapted to register with a pointer 55b on the lower track 57.

To adjust the flag 56 relatively with respect to the zero position of the needle, opposite ends of the flag have secured thereto, respectively, opposite ends of a flexible cable 59 which passes over idler pulleys 60 secured to the face of the dial 24b and is wrapped, in one or more turns about a small sheave 61 rotatably journaled on a stud or pin 62 positioned in axial alignment with the coil pivot 22. The front face of the sheave 61 is provided with a square recess into which fits the squared inner end 63 of a shaft 64. The shaft 64 is rotatably journaled in a hollow shaft 65 which in turn, is rotatably journaled and passes through the front wall and glass of the meter case and is provided on its outer end with a knob 66. The inner end of the shaft 65 has secured thereto an arm 45b which engages the slotted end 46 of the spring adjusting arm 26 and serves to adjust the zero position of the needle 23 with respect to the battery size, or number of plate scale 30b.

The outer end of the shaft 64 is provided with a knob 67 by means of which the shaft 64 is rotated to rotate the sheave 64 and adjust the condition indicating flag 56 with respect to the zero position of the needle according to the electrolyte temperature of the battery under test.

I claim:

1. An electrical instrument for indicating the condition of a specimen, where a true indication of the condition is dependent upon variable characteristics of the specimen, comprising a fixed dial, an indicator movable across the face thereof in response to an electrical characteristic of said condition from a zero position to a deflected position dependent upon the value of said electrical characteristic, a movable dial superposed with respect to the face of said dial and bearing a graduated scale of values of said condition adapted to cooperate with the indicator in a deflected position thereof to give a reading of said condition, a case for the instrument having a front wall, means including a knob exteriorly of said front wall for adjusting the movable dial relatively with respect to said zero position, other means including a second knob exteriorly of said wall for adjusting the zero position of the indicator relatively with respect to said movable dial, a scale of values of one of said variable characteristics on the fixed dial near the zero position of the indicator and cooperating with said indicator for visually indicating the adjusted position thereof, and means including a scale of values of another of said variable characteristics cooperating between the fixed and movable dials for visually indicating the adjusted position of the movable dial.

2. An electrical instrument for indicating the condition of a specimen, where a true indication of the condition is dependent upon variable characteristics of the specimen, comprising an indicator movable about a pivotal axis thereof from a zero position to a deflected position dependent upon the value of an electrical characteristic of said condition, means for adjusting the zero position of said indicator, a movable dial mounted for arcuate movement about said axis and having a scale of values of said condition adapted to cooperate with the indicator in said deflected position to give a reading of said condition, means including a pair of concentric rotatable shafts having operative connections respectively with said zero adjusting means and said movable dial for respectively adjusting said zero position of the indicator and said scale relatively with respect to each other in accordance respectively with two of said variable characteristics of the specimen, and a knob secured to each shaft.

3. An electrical instrument for indicating the condition of a specimen, where a true indication of the condition is dependent upon variable characteristics of the specimen, comprising an indicator movable about a pivotal axis thereof, in response to an electrical characteristic of said condition from a zero position to a deflected position dependent upon the value of said electrical characteristics, means for adjusting the zero position of said indicator, a movable dial mounted for arcuate movement about said axis and having a scale of values of said condition adapted to cooperate with the indicator in said deflected position to give a reading of said condition, means including a pair of concentric rotatable shafts having operative connections respectively with said zero adjusting means and said movable dial for respectively adjusting said zero position of the indicator and said scale relatively with respect to each other in accordance respectively with two of said variable characteristics, a knob secured to each shaft, a scale of values of one of said variable characteristics near said zero position and cooperating with the indicator for visually indicating the adjusted zero position thereof, and means including a scale of values of the other variable characteristic cooperating with the movable dial for visually indicating the adjusted position thereof.

4. An electrical instrument for indicating the condition of a specimen, where a true indication of the condition is dependent upon variable characteristics of the specimen, comprising a fixed dial, an indicator movable across the face thereof through an arc about a pivotal axis in response to an electrical characteristic of said condition from a zero position to a deflected position dependent upon the value of said characteristic, a pair of independently rotatable concentric shafts axially aligned with said pivotal axis, a flag carried by one of said shafts of movement through an arc about said axis adjacent and parallel to the face of said fixed dial, means including one of said shafts for adjusting the position of said flag relatively with respect to said zero position in accordance with the value of one of said variable characteristics, said flag bearing an arcuate scale of values of said condition adapted to cooperate with the indicator in the deflected position thereof to give a reading of said condition, means including the other shaft for adjusting the zero position of the indicator relatively with respect to said scale in accordance with another of said variable characteristics, a fixed scale of values of the first named variable characteristic near the deflected position of the indicator, pointer means on the flag cooperating with said fixed scale for visually indicating the adjusted position of the flag, a fixed scale of values of the other variable characteristic near said zero position and cooperating with the indicator for visually indicating the adjusted zero position thereof, and knob means respectively for each shaft for rotating the same.

5. An electrical instrument for indicating the condition of a specimen, where a true indication of the condition is dependent upon variable characteristics of the specimen, comprising a fixed dial, an indicator movable across the face thereof through an arc about a pivotal axis in response to an electrical characteristic of said condition from a zero position to a deflected position dependent upon the value of said electrical characteristic, a flat movable plate superposed on the face of said fixed dial, said plate having opposed arcuate edges, means including an arcuate track for guiding, the movement of said plate in an arcuate path about said pivotal axis, said plate bearing at least one scale of values of said condition adapted to cooperate with the indicator in a deflected position thereof to give a reading of said condition, means including a first rotatable shaft for adjusting the zero position of the indicator relatively with respect to the position of said plate in accordance with the value of one of said variable characteristics, other means including a second rotatable shaft for adjusting said plate relatively with respect to said zero position, knob means carried by each shaft for independently rotating the same, a scale of values of one of said variable characteristics on the fixed dial near the said zero position and cooperating with the indicator for visually indicating the adjusted position thereof, a second scale of values of another of said variable characteristics on said plate, and pointer means carried by the fixed dial cooperating with the last named scale for visually indicating the adjusted position of said plate.

6. An electrical instrument for indicating the condition of a specimen, where a true indication of the condition is dependent upon variable characteristics of the specimen, comprising a fixed dial, an indicator movable across the face thereof through an arc about a pivotal axis in response to an electrical characteristic of said condition from a zero position to a deflected position dependent upon the value of said electrical characteristic, a flat movable plate superposed on the face of said fixed dial, said plate having opposed arcuate edges, one of said edges being provided with gear teeth, means including an arcuate track for guiding the movement of said plate in an arcuate path about said pivotal axis, said plate bearing at least one scale of values of said condition adapted to cooperate with the indicator in a deflected position thereof to give a reading of said condition, means including a first rotatable shaft for adjusting the zero position of the indicator relatively with respect to the position of said plate in accordance with the value of one of said variable characteristics, a second rotatable shaft having a gear carried thereby meshing with said gear teeth for adjusting the plate relatively with respect to said zero position in accordance with another of said variable characteristics, knob means carried by each shaft for independently rotating the same, a scale of values of one of said variable characteristics on the fixed dial near the said zero position and cooperating with the indicator for visually indicating the adjusted position thereof, a second scale of values of another of said variable characteristics on said plate, and pointer means carried by the fixed dial cooperating with the last named scale for visually indicating the adjusted position of said plate.

7. An electrical instrument for indicating the condition of a specimen, where a true indication of the condition is dependent upon variable characteristics of the specimen, comprising a fixed dial, an indicator movable across the face thereof through an arc about a pivotal axis in response to an electrical characteristic of said condition from a zero position to a deflected position dependent upon the value of said electrical characteristic, a flat movable plate superposed on the face of said fixed dial, said plate having opposed arcuate edges, means including an arcuate track for guiding, the movement of said plate in an arcuate path about said pivotal axis, said plate bearing at least one scale of values of said condition adapted to cooperate with the indicator in a deflected position thereof to give a reading of said condition, a pair of independently rotatable shafts axially aligned with said pivotal axis, knob means respectively for each shaft to manually rotate the same, means having an operative connection with one of said shafts for adjusting the zero position of the indicator relatively with respect to said plate in accordance with one of said variable characteristics, means including a flexible cable operatively connecting the other shaft with said plate for adjusting the same relatively with respect to said zero position in accordance with another of said variable characteristics, a scale of values of one of said variable characteristics on the fixed dial near the said zero position and cooperating with the indicator for visually indicating the adjusted position thereof, a second scale of values of another of said variable characteristics on said plate, and pointer means carried by the fixed dial cooperating with the last named scale for visually indicating the adjusted position of said plate.

CLARENCE W. DALZELL.

REFERENCES CITED

The following references are of record in the file of this patent:

UNITED STATES PATENTS

| Number | Name | Date |
| --- | --- | --- |
| 1,100,723 | Gehrkens | June 23, 1914 |
| 1,258,284 | Weinrich | Mar. 5, 1918 |
| 1,314,610 | Smith et al. | Sept. 2, 1919 |
| 2,164,513 | Gaebel | July 4, 1939 |